US011012837B2

(12) United States Patent
Jiménez

(10) Patent No.: US 11,012,837 B2
(45) Date of Patent: May 18, 2021

(54) PERIODIC MANAGEMENT STABILIZATION FOR INTERNET OF THINGS

(71) Applicant: Telefonaktiebolaget LM Ericsson (publ), Stockholm (SE)

(72) Inventor: Jaime Jiménez, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 169 days.

(21) Appl. No.: 15/310,997

(22) PCT Filed: May 13, 2015

(86) PCT No.: PCT/SE2015/050543
§ 371 (c)(1),
(2) Date: Nov. 14, 2016

(87) PCT Pub. No.: WO2015/174916
PCT Pub. Date: Nov. 19, 2015

(65) Prior Publication Data
US 2017/0086010 A1 Mar. 23, 2017

Related U.S. Application Data

(60) Provisional application No. 61/996,775, filed on May 14, 2014.

(51) Int. Cl.
*H04M 3/42* (2006.01)
*H04W 4/50* (2018.01)
(Continued)

(52) U.S. Cl.
CPC .............. *H04W 4/50* (2018.02); *H04W 4/70* (2018.02); *H04W 68/04* (2013.01); *H04W 88/16* (2013.01)

(58) Field of Classification Search
CPC ...... H04L 29/08108; H04W 4/02; H04W 4/14
(Continued)

(56) References Cited

U.S. PATENT DOCUMENTS 6,987,757 B1 * 1/2006 Akiyama ................ H04L 12/66
370/353
8,549,119 B1 * 10/2013 Singh .................. H04L 41/0853
709/222

(Continued)

FOREIGN PATENT DOCUMENTS

CN 103716822 A 4/2014

OTHER PUBLICATIONS

European Communication dated Jan. 4, 2018, issued in European Patent Application No. 15 728 657.6, 4 pages.
(Continued)

*Primary Examiner* — Matthew W Genack
(74) *Attorney, Agent, or Firm* — Sage Patent Group

(57) ABSTRACT

A method is executable on a Gateway which is capable of communicating with a Machine Device, a User Device and a Manager Device. The method comprise receiving, from the Manager Device, a first request, requesting for status information associated with the Machine Device, after which the Gateway is determining under which conditions to acquire the requested status information, and to send the acquired status information to the Manager Device. Next the Gateway is determining the relevant status information of the Machine Device, based on a response to a second request, requesting for updated data associated with the Machine Device, the second request being provided to the Machine Device from the Used Device, and the response being received from the Machine Device by the Gateway, (Continued)

after which a notification, comprising the determined status information, is provided from the Gateway to the Manager Device.

9 Claims, 6 Drawing Sheets

(51) Int. Cl.
*H04W 4/70* (2018.01)
*H04W 68/04* (2009.01)
*H04W 88/16* (2009.01)

(58) Field of Classification Search
USPC .................................. 455/414.1–414.3, 466
See application file for complete search history.

(56) References Cited

U.S. PATENT DOCUMENTS

| | | | | |
|---|---|---|---|---|
| 2002/0057710 | A1* | 5/2002 | Shibasaki | G06K 17/0022 |
| | | | | 370/449 |
| 2004/0205439 | A1* | 10/2004 | Carmeli | H04L 1/1848 |
| | | | | 714/748 |
| 2008/0192668 | A1* | 8/2008 | Okubo | H04L 45/04 |
| | | | | 370/312 |
| 2012/0157050 | A1 | 6/2012 | Kang et al. | |
| 2012/0307764 | A1* | 12/2012 | Zhao | H04W 28/24 |
| | | | | 370/329 |
| 2013/0329653 | A1* | 12/2013 | Russell, Jr. | H04W 8/20 |
| | | | | 370/329 |
| 2014/0029515 | A1 | 1/2014 | Arkko et al. | |
| 2014/0213252 | A1* | 7/2014 | Jung | H04W 8/186 |
| | | | | 455/435.1 |
| 2014/0341041 | A1* | 11/2014 | Velev | H04W 4/70 |
| | | | | 370/236 |
| 2015/0382132 | A1 | 12/2015 | Wu et al. | |

OTHER PUBLICATIONS

International Search Report and Written Opinion dated Aug. 19, 2015 in International application No. PCT/SE2015/050543, 11 pages.
Hartke, K., "Observing Resources in CoAP draft-ietf-core-observe-12", CoRE Working Group, Internet—Draft, Feb. 14, 2014, 33 pages.
Open Mobile Alliance, "Lightweight Machine to Machine Technical Specification", Candidate Version 1.0, Dec. 10, 2013, 104 pages.
Shelby, Z., et al., "Constrained Application Protocol (CoAP) draft-ietf-core-coap-18", CoRE Working Group, Internet—Draft, Jun. 28, 2013, 118 pages.

* cited by examiner

PERIODIC MANAGEMENT STABILIZATION FOR INTERNET OF THINGS

CROSS-REFERENCE TO RELATED APPLICATION(S)

This application is a 35 U.S.C. § 371 National Phase Entry Application from PCT/SE2015/050543, filed May 13, 2015, and designating the United States, which claims priority to U.S. Provisional Application No. 61/996,775, filed on May 15, 2014. The contents of both applications are incorporated by reference.

TECHNICAL FIELD

The present disclosure relates to methods and arrangements for enabling management of Machine Devices, a Gateway and a Manager Device, capable of executing the suggested methods.

BACKGROUND

Constrained Application Protocol (CoAP) is a specialized web transfer protocol designed for handling Machine to Machine (M2M) applications in constrained nodes and constrained networks. CoAP provides a request response based architecture between endpoints, where communication is performed between entities, typically referred to as a CoAP Server and a CoAP Client, respectively, over User Datagram Protocol (UDP).

CoAP is designed to easily work along with Hypertext Transfer Protocol (HTTP) for integration with the current Web, while adding additional features, such as e.g. multicast support, very low overhead and simplicity for constrained environments. More information on CoAP can be found on http://tools.ietf.org/html/draft-ietf-core-coap-18.

One available extension to CoAP enables CoAP clients to observe available resources from CoAP servers, or in other words, CoAP servers are allowed to notify CoAP Clients of available resources, as can be seen in http://tools.ietf.org/html/draft-ietf-core-observe-12. This enables server-initiated communication in constrained networks using CoAP.

Open Mobile Alliance Device management Lightweight (OMA DM LW) is a light and compact device management protocol developed for M2M networks, which includes device management and service enablement for LWM2M enabled devices, as described in Lightweight Machine to Machine Technical Specification, Candidate Version 1.0—10 Dec. 2013, OMA-TS-LightweightM2M-V1_0-20131210-C in section 5.1-5.4. Being designed for constrained networks, OMA DM LW can run over both UDP and SMS bindings. This enables OMA DM LW to be applicable with any type of constrained device or network using CoAP.

The architecture of OMA DM LW is based on a client-server model, including both a LWM2M Server and a LWM2M Client, similar to CoAP. However, in OMA DM LW, the LWM2M Client runs in the constrained device to be controlled, while the LWM2M Server represents a node with some management capability, which may be either a Gateway (GW) or a network node. For typical Internet of Things (IoT) scenarios, it will be commonplace to have multiple clients, a few servers and several nodes acting as relays or proxies, where each of these nodes comprises both a client and a server side. In fact, very much like CoAP, the frontier between Server and Client can be fuzzy, since all LWM2M Clients are most likely also CoAP Servers and most LWM2M Servers should also be CoAP Clients.

OMA DM LW introduces a simple object based resource model for management, inherited from CoAP, to be used between LWM2M Server and LWM2M Client. In this model, each piece of information made available by a LWM2M Client is a Resource and Resources are logically organized into Objects. Hence, an object defines a grouping of Resources, for example Object ID 3 "Device" contains all the Resources used for device related information.

OMA DM LW provides several interfaces towards access objects, among which the "Information Reporting" is provided for error reporting. This interface allows LWM2M Servers to observe resources and to be notified whenever changes occur in a network, (very much following the publish/subscribe paradigm.)

Existing management solutions are usually composed the following entities:

Machine Devices (MDs): Devices, which can be constrained devices, comprising one or more sensors and/or actuators, where the device is running some management Agent (here the LWM2M protocol is used for this purpose) that have to provide information about what the sensors are sensing, as well as report management errors and other relevant issues. Sensors can also run the customary CoAP server to provide users access to readings.

Manager Device: An entity running a management application which is taking care of sending commands, updating firmware and other Objects of the MDs. In real deployments the Manager Device may also contain a LWM2M Server.

Gateway (GW): This entity is arranged between Agents and Manager Device, in case the MD is a constrained device which is not itself capable of providing adequate Internet connectivity. The GW is running a Resource Directory (RD) and possibly a cache of received messages, such as e.g. a Mirror Proxy (MP) towards its MDs. The GW runs some management protocol (LWM2M in this example) towards the Manager Device too. During the registration process of every MD (normally executed when bootstrapping the MD) the MD registers to the RD in the GW.

User: An end user which is capable of requesting for, and receiving the latest measurements of the MDs via a communication device which comprises a CoAP Client.

There are typically multiple Management operations that can be done on a sensor of an MD, such as e.g. upgrading of firmware, changing access control policies, changing security settings and setting alarms. In LWM2M there are specific Objects in each device to represent this type of information. This feature is inherited from CoAP Objects and resources; in fact LWM2M works in pretty much the same way as CoAP. The manager can use GET or PUT messages to retrieve or store information on any of these objects and set notifications by using the Observe command.

Another function that Manager Devices need for managing MDs is to be aware of whether the MDs are connected or not. This is especially true for large IoT deployments. However, just to keep track of the general status of various devices typically requires a lot of message overhead towards the Manager Device.

Despite the fact that both CoAP and LWM2M protocols are extremely similar they are currently not capable of communicating with each other. Management objects are used only for management purposes, while data plane objects, or resources, are only used for data or user plane information. In other words, while measurement information is provided to a CoAP Client, Management reports are provided to a LWM2M Server, which is not an ideal situation. More specifically, LWM2M runs on top of CoAP, where CoAP defines multiple messages and entities, such as e.g. RD and/or MP to facilitate communication with the user. With other protocols, such as e.g. HTTP or Simple Network Management Protocol (SNMP), you normally have a clear differentiation between data plane and control plane, but with CoAP and LWM2M all messages are encapsulated using CoAP.

This would normally mean that all entities using CoAP would be aware of each other and that the protocols would be optimized to send as few messages as possible. This is however not the case here.

Normally CoAP messages will be used for the data plane, e.g. for getting sensor readings, or resource discovery, and LWM2M for management commands, such as e.g. error reports. These two types of messages/commands will be running as different processes in the MDs, namely as user processes and manager processes, respectively.

This means that there will be a lot of overlapping of messages and message overhead. The fact that an MD is awake will for example be advertised twice, once for the user and once for the Manager Device.

When using standard LWM2M, the Manager Device can set a notification to be received when a specific MD is awake. The Manager Device can also poll the objects in an MD to become aware of if it is connected too. However, this is a highly inefficient procedure since every MD has to send one message, saying that it is awake every time it wakes up and, as a consequence, on each such occurrence, the Manager Device will receive one extra message per device. This clearly poses scalability problems, since, as the number of deployed MDs increases, there will be a need to deploy dedicated machines to aggregate and handle management information. It is also not far fetched that in the future management messages will get as large as data messages, which will increase the workload on all involved entities even further.

SUMMARY

It is an object of the present document to address, or at least alleviate, at least some of the problems described above.

According to one aspect, a method, executable on a Gateway, capable of communicating with a Machine Device, a User Device and a Manager Device, is suggested. The suggested method comprises: receiving, from the Manager Device, a first request, requesting for status information associated with the Machine Device; determining under which conditions to acquire the requested status information, and to send the acquired status information to the Manager Device; determining the relevant status information of the Machine Device, based on a response to a second request, requesting for updated data associated with the Machine Device, the second request being provided to the Machine Device from the Used Device, and the response being received from the Machine Device by the Gateway, and providing a notification, comprising the determined status information, to the Manager Device.

One advantage with the suggested method is that one can make use of conventional status updates, already applied by Machine Devices for updating user devices, also for the purpose of getting updated on the present status of the Machine Device, thereby reducing the total amount of signaling, required for obtaining the mentioned information.

According to one embodiment, the determination of relevant status is preceded by forwarding of the first request to the Machine Device.

In case the status report is to be time limited, a timer may be applied, wherein the method described above also comprise the following steps: initiating a timer upon forwarding the second request to the Machine Device, and determining the relevant status information based on: content of the response to the second request, in case such a response is received before time-out of the timer, or status information already known by the Gateway, in case no such response is received prior to time-out of the initiated timer.

According to one embodiment, the conditions under which to acquire the requested status information are provided to the Gateway from the Manager Device.

Once status information has been received in a response to the second request it can, according to one embodiment, be stored on, or accessible to, the Gateway.

According to another aspect, a computer program is suggested which comprises code means which when run on a computer causes the computer to execute a method according to any of the embodiments described above.

According to yet another aspect, a computer program product is suggested, which comprises computer readable code means and a computer program as suggested above, and which is stored on said computer readable code means.

According to another aspect, a method executable on a Manager Device, capable of communicating with a machine device via Gateway, is suggested. The method comprise: transmitting, to the Gateway, a first request, requesting the Gateway to provide status information associated with the Machine Device based on content of a response to a second request, requesting for updated data associated with the Machine Device, the second request being provided to the Machine Device from a Used Device, and the response being received from the Machine Device by the Gateway, and receiving, from the Gateway, a notification comprising the requested status information.

According to one embodiment, the first request also comprises instructions, instructing the Gateway under which conditions the requested status information is to be acquired by the Gateway.

More specifically, the instructions can be configured to instruct the Gateway to acquire the requested status information from the response received from the Machine Device, in case such a response is received, or to acquire status information associated with the Machine Device from storage of the Gateway, in case no such response is received.

According to another aspect, a computer program is suggested which comprises code means which when run on a computer causes the computer to execute a method according to any the embodiments of the method executable on a Manager Device.

According to yet another aspect, a computer program product is suggested, which comprises computer readable code means and a computer program as suggested above, and which is stored on said computer readable code means.

According to another aspect, a Gateway, capable of communicating with a Machine Device, a User Device and a Manager Device is suggested, wherein the Gateway comprise means for: receiving, from the Manager Device, a first request, requesting for status information associated with the Machine Device; determining under which conditions to acquire the requested status information, and to send the acquired status information to the Manager Device; determining the relevant status information of the Machine Device, based on content of a response to a second request, requesting for updated data associated with the Machine Device, the second request being provided to the Machine Device from the Used Device, and the response being received from the Machine Device by the Gateway, and providing, to the Manager Device, a notification comprising the determined status information.

The Gateway also comprises means for forwarding the first request to the Machine Device.

In case the Gateway is to apply a time limit for reporting a status to the Manager Device the method suggested above also comprises means for: Initiating a timer upon forwarding the second request to the Machine Device, and determining the relevant status information based on: content of the response to the second request, in case such a response is received before time-out of the timer, or status information already known by the Gateway, in case no such response is received prior to time-out of the initiated timer.

Typically, the Gateway also comprises means for storing the status information received in the response to the second request.

According to yet another aspect, a Gateway, capable of communicating with a Machine Device, a User Device and a Manager Device is suggested. The Gateway comprise a processor and a memory, where the memory comprises instructions, which when executed by the processor causes the Gateway to: receive, from the Manager Device, a first request, requesting for status information associated with the Machine Device; determine under which conditions to acquire the requested status information, and to send the acquired status information to the Manager Device; determine the relevant status information of the Machine Device, based on content of a response to a second request, requesting for updated data associated with the Machine Device, the second request being provided to the Machine Device from the User Device, and the response being received from the Machine Device by the Gateway, and provide, to the Manager Device, a notification comprising the determined status information.

According to another aspect, a Manager Device, capable of communicating with a Machine Device and a Gateway is suggested. The Manager Device comprise means for: transmitting, to the Gateway, a first request, requesting the Gateway to provide status information associated with the Machine Device based on content of a response to a second request, requesting for updated data associated with the Machine Device, the second request being provided to the Machine Device from a Used Device, and the response being received from the Machine Device by the Gateway, and receiving, from the Gateway, a notification comprising the requested status information.

According to one embodiment, the suggested means comprise instructions instructing the Gateway under which conditions the requested status information is to be acquired by the Gateway into the first request.

The suggested means may be configured to provide instructions to the Gateway to acquire the requested status information from the response received from the Machine Device, in case such a response is received, or to acquire status information associated with the Machine Device from storage of the Gateway, in case no such response is received.

According to another aspect, a Manager Device, capable of communicating with a Machine Device and a Gateway is suggested. The Manager Device comprise a processor and a memory, where the memory comprises instructions, which when executed by the processor causes the Manager Device to: transmit, to the Gateway, a first request, requesting the Gateway to provide status information associated with the Machine Device based on content of a response to a second request, requesting for updated data associated with the Machine Device, the second request being provided to the Machine Device from a Used Device, and the response being received from the Machine Device by the Gateway, and receive a notification comprising the requested status information, from the Gateway.

BRIEF DESCRIPTION OF DRAWINGS

Embodiments will now be described in more detail in relation to the accompanying drawings, in which.

DETAILED DESCRIPTION

Figure 1:
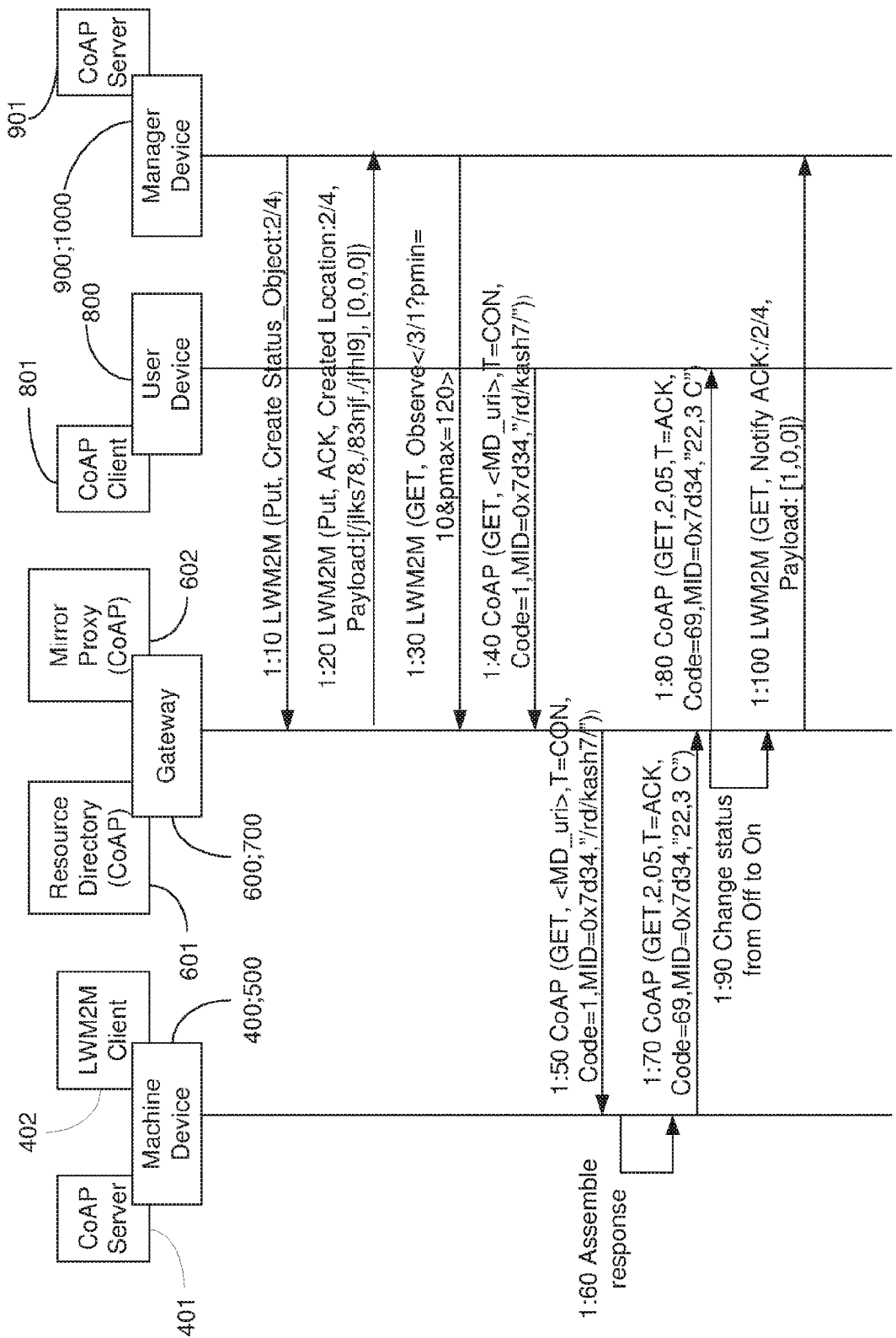
FIG. 1 is a signaling scheme, illustrating how a user and a Manager Device can acquire information from a Machine Device via a Gateway.

Briefly described a method is suggested, which could be referred to as a periodic management stabilization procedure, for optimizing handling of messages that are to be distributed between Manager Devices and Agents operable in Machine Devices, or M2M devices, which are typically constrained devices. The disclosed procedure may make use of, and take advantage of, piggybacking on already used data plane messages, here referred to as CoAP messages, in order to retrieve information on whether or not an agent is awake, or to become aware of other status information, which can be interpreted from received COAP messages.

Nowadays, MDs will often be arranged behind GWs that will themselves contain RDs, since most MDs themselves, being configured as constrained devices, do not have any cellular or other connectivity functionality towards the Internet. Whenever a GW receives a CoAP Observation message (which can be different from the LWM2M Observe), sent towards an MD, via the GW, the GW will try to poll the requested resources of an MD. If the MD is asleep, the GW will try to access the cached data, for example by forwarding the request to a Mirror Proxy (MP), after which the user will get the latest cached reading from the MP.

In order to avoid this type of polling, a user, here acting as a CoAP Client, will be able to observe sensor resources and get notifications when an observed sensor resource changes, e.g. following Internet Engineering Task Force (IETF's) example, given in http://tools.ietf.org/html/draft-ieft-core-observe-12:

For a CoAP Server with an attached temperature sensor, the server could expose a parameterized resource: <coap://server/temperature/critical?above=45> that changes its state to the current temperature if the temperature exceeds the specified value, here 45° C., and changes its state to "OK" when the temperature drops below that threshold value;"

In the scenario described above the CoAP Server would notify the CoAP Client about the current state of the resource of an MD when it changes. Since it will often be the case that the MD is arranged behind some GW, it will be the GW that forwards this change to the user. According to the Observe option specification, mentioned above the subject of the observation could alternatively be the GW directly.

As an alternative to the procedure mentioned above, a method is suggested herein, where the GW also produces, by default, a new LWM2M Notify message to be sent to the Manager Device, with a purpose of alerting the Manager Device that an MD (which comprise at least one sensor) is now awake. By default, the GW cannot know the content of the message provided from the CoAP Server to the CoAP Client; however despite possible encryption the Manager Device can know that the CoAP Server of the MD generated at least one message and that it is therefore presently awake. According to an alternative embodiment, a notification to be sent to the Manager Device can be generated periodically, aggregating multiple resources under the GW/RD.

The method suggested above will now be described in further detail with reference to FIG. 1, describing a network configured to handle a plurality of Machine Devices, each comprising one or more of sensors and/or actuators, a CoAP Server and a LWM2M Client, where, for simplicity reasons, only one of these Machine Devices (MD), namely an MD 400;500 which is changing state, is of particular interest, and is therefore shown in the figure. FIG. 1 also illustrates one communication device, here referred to as a User Device 800, comprising a CoAP Client 801, which is capable of acquiring updates on the MDs via an intermediately located Gateway (GW) 600;700, comprising a CoAP Resource Directory (RD) 601 and a CoAP Mirror Proxy (MP) 602. In addition, a Manager Device 900;1000, comprising a CoAP Server 901, is initiating the described process. In the present arrangement, while the User Device 800 will be updated on sensor/actuator output of an MD 400;500, the Manager Device 900;1000 will be updated on the status of the MD 400;500.

As shown in FIG. 1, during bootstrapping of an MD 400;500, the Manager Device 900;1000 creates a new Object (Status_Object) in the GW 600;700, by transmitting a Creation message to the GW 600;700, as indicated with a first step 1:10. Optionally, this message can also contain instructions to the GW 600;700 on how, i.e. under which conditions, to aggregate notifications from the MDs 400;500 (e.g. the size of PDU, max Delta, etc.). In the latter case a certain delay time may be applied in order to collect more notifications to aggregate. In a Creation Response message, the GW 600;700 will include the location of the new Object and the existing status information of the MDs 400;500. In the present example a series of MD's are already registered in the RD (notice that during Registration in LWM2M, the LWM2M Client is supposed to create an entry per device under the RD) and their respective URNs. This Creation Response message is indicated as a step 1:20. In the given example the RD location for the existing three MDs are: [/jlks78, /83njf, /jfhl9], with their URNs e.g. [91058, 260890, 210995] and their current status [0,0,0]), where a current status "0" indicates that the MD is off, while a status set to "1" indicates that the respective MD is on. Obviously all three MDs are initially off in the given example.

Once the Object mentioned above has been created in the GW 600;700 the Manager Device 900;1000 will observe the Status_Object, as indicated in a third step 1:30. In the given example this means that this message instructs the GW 600,700 that it shall wait at least a minimum time interval, e.g. 10 seconds, before sending another notification to the Manager Device 900;1000 and never more than a maximum time interval, e.g. 120 seconds, i.e. even if no MD has changed within the determined maximum time interval a notification will be sent from the GW 600;700 to the Manager Device 900;1000 after that time interval. The suggested time intervals are applied in order to keep the latest status information on the Manager Device 900;1000 at least every 120 seconds, and so that the Manager Device 900;1000 still neatly get status updates. At this point, every time there is a modification in any of the resources, represented by MDs (i.e. when an MD 400;500 replies to a CoAP data request by sending a CoAP message) the GW 400;500 should notify the Manager Device 900;1000 with a notification, provided as a LWM2M message.

In the given example, the User Device 800, running a CoAP Client, issues a GET request to the in GW 600;700, here in order to get the latest temperature measurement from MD 400;500, as indicated with step 1:40:

coap://temp1.92738.room1.example.com/temperature.

The RD and MP are in this case both co-located in the GW 600;700 so discovery is immediate. The GW 600;700 simply forwards the request to the MD 400;500, as indicated with step 1:50. The MD 400;500 receives the GET request sent by GW 600;700 in step 1:50, and piggybacks the payload with the requested temperature information, on a confirmable response, as indicated with step 1:60, and sends this information to the GW 600;700 in another step 1:70. The GW 600;700 forwards the information to the User Device 800, as indicated in another step 1:80. The GW 600;700 will not be able to read the content of the payload provided from any of the MDs, because normally such content will be encrypted, but the GW 600;700 will in any event be able to determine that the message of step 1:70 was actually received from a specific MD 400;500, and, thus, from this information alone the GW 600;700 is able to determine that this Machine Device 400;500 is now awake. The GW 600;700 will at a next step 1:90 change the MDs' 400;500 status in the Status_Object, since the Manager Device 400;500 previously set an Observation in that Object, as indicated above with step 1:30. The GW 600;700 then notifies the Manager Device 400;500 of the MDs 400;500 newly discovered awake status in the payload of another message 1:100, while, the other parameters, namely the RD location and URN, remain the same, i.e. are unchanged.

Simultaneously, with forwarding the request in step 1:50, may GW start a timer, and in the present example, in case no response has been received within 120 seconds, a response corresponding to the message sent in step 1:100 will be sent to the Manager Device 900;1000, this time, however, indicating that the MD 400;500 is not awake. In the latter case, no message, corresponding to step 1:80, will be sent to the User Device 800, since the User Device 800 will only be notified when updates are actually received from the MD 400;500. Alternatively, without having any maximum time set for reporting to the Manager Device 900;1000, absence of a response from the MD 400;500, i.e. any step 1:70 response, simply results in that no message is provided to the Manager Device 900;1000 from the GW 600;700.

To summarize, any change in the data plane, i.e. updates in the output of a sensor (use plane updates) will be provided both to the User Device (CoAP message) and the Manager Device (LWM2M message), while management updates, here typically status updates of an MD, will only be provided to the Manager Device by the GW.

The method discussed above proposes use of a Status_Object to get status information from MDs in a compressed manner. This can be easily achieved on the basis of the LWM2M specification, since we only need to create a new Object and set basic configuration parameters accordingly.

The disclosed method also makes better use of the commonalities of CoAP and LWM2M and the entities they both use.

The disclosed method enhances management scalability, since it requires 1 creation message+1 Observation message per RD/GW, and the number of required periodically initiated notifications are limited to a similar amount of notifications, regardless of whether a network comprise 1 or 100 MDs which are arranged behind a GW. In the current LWM2M specification, management instead implies setting specific Objects in every LWM2M client and requires aggregation mechanisms in the GW or other network entities, it also requires more computation and messaging on the constrained device. More specifically, in a commonly known scenario, a LWM2M server will have to write an observation in each respective MD itself, instructing it to notify the LWM2M server every time it wakes up. Since MDs are commonly power constrained devices, reduction of the amount of messages that need to be sent from these entities is desired. This will not be necessary when the method as suggested above is applied.

In addition, by aggregating reports sent from the GW to a Manager Device, required signaling can be reduced even further.

When an MD sends a CoAP response to a CoAP Client, it will at the same time generate a notification to be provided to the Manager Device, instead of just one single message. The suggested method allows, in a neat manner, the GW to become aware of whether an MD is awake or not in real time, without having to set any specific information in the respective LWM2M Client. This information can also be retrieved irrespective of any encryption used between an MD and a user, i.e. the required information can be acquired without requiring any decryption of the message, but simply by receiving it as such.

Figure 2:
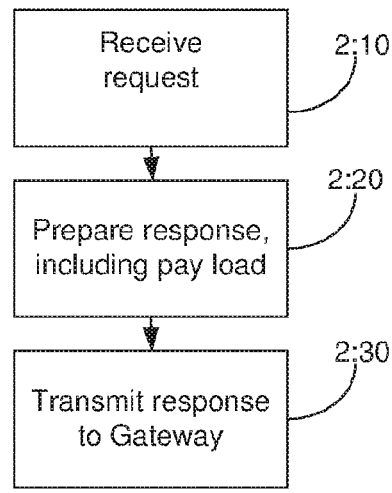
FIG. 2 is a flow chart, illustrating a method executed in a Machine Device for handling requests originating from a User Device.

FIG. 2 is a flow chart of the method described above when executed at an MD, where, in a first step 2:10, a request provided from a User Device via a Gateway, requesting for an observation of a resource, here the MD, is received by the MD. The MD handles the request in a conventional manner, e.g. by providing fresh results from one or more sensors, by attaching, typically by piggy backing such content on a confirmable, conventional response, as indicated with step 2:20, and transmitting the response to the GW for further processing there.

Figure 3:
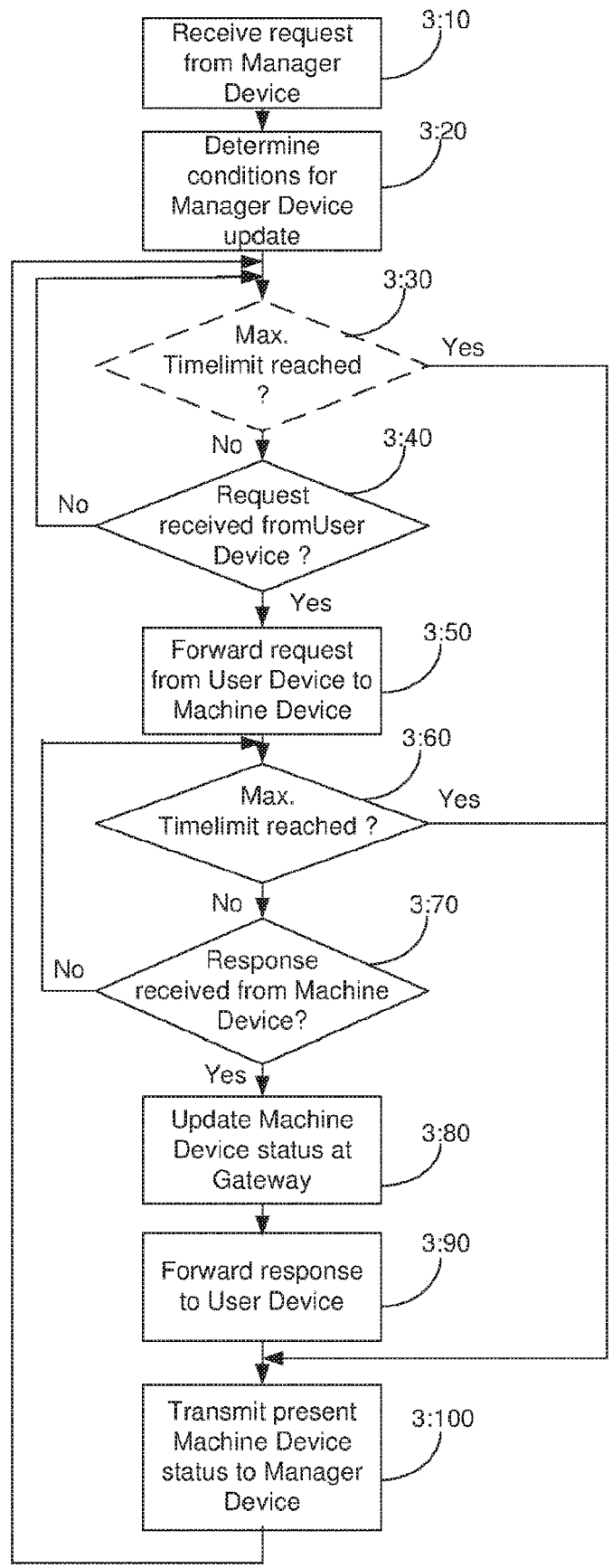
FIG. 3 is a flow chart, illustrating a method executed in a Gateway for handling requests originating from a User Device and for updating a Manager Device based on the mentioned requests.

FIG. 3 is another flow chart, illustrating a corresponding method executed at a GW. In a first step 3:10, a request to monitor the status of one or more MDs is initiated by, and received from a Manager Device. In a next step 3:20, the process initiated at step 3:10 is completed by determining, or negotiating, under which conditions monitoring of MDs is to be executed. Once conditions have been settled in step 3:20, a timer may be started, as indicated with optional step 3:30, in case a maximum time limit for getting status updates has been settled in step 3:20. As long as such a time limit has not been reached the process continues at step 3:40, where it is checked whether a request from a user to obtain updated output from at least one MD has been received or not. Once it is determined that a request has been received, such a request is routed towards the respective MD, as indicated in a next step 3:50. Once a request has been forwarded in step 3:50, another timer is typically started, if a time limit is to be applied when awaiting for a response, as indicated in step 3:60, for determining how long time the GW should await a response from an MD, as indicated in a following step 3:70. Once a response is received from the MD, the GW updates the MD status, as indicated in step 3:80, and the response is forwarded to the User Device, as indicated with a step 3:90. In a next step 3:100, the present status of the MD is transmitted to the Manager Device. As indicated in FIG. 3, transmission of the present status to the Manager Device is also executed, in case of expiry of a timer of step 3:30. Obviously, the status will be set to "On" in case a response is received from the MD, while in case of no response, the status will be set to "Off". The same applies if no response is received in step 3:70. As already mentioned, step 3:100 may be configured to be postponed a predetermined time interval, e.g. in case aggregation of the result from a plurality of MDs is to be executed. Once an update has been provided to the Manager Device, the process is repeated from step 3:30, by initially starting a timer once again, if such a timer is to be applied, but in any event the process is continued by awaiting another request from a User Device.

Figure 4:
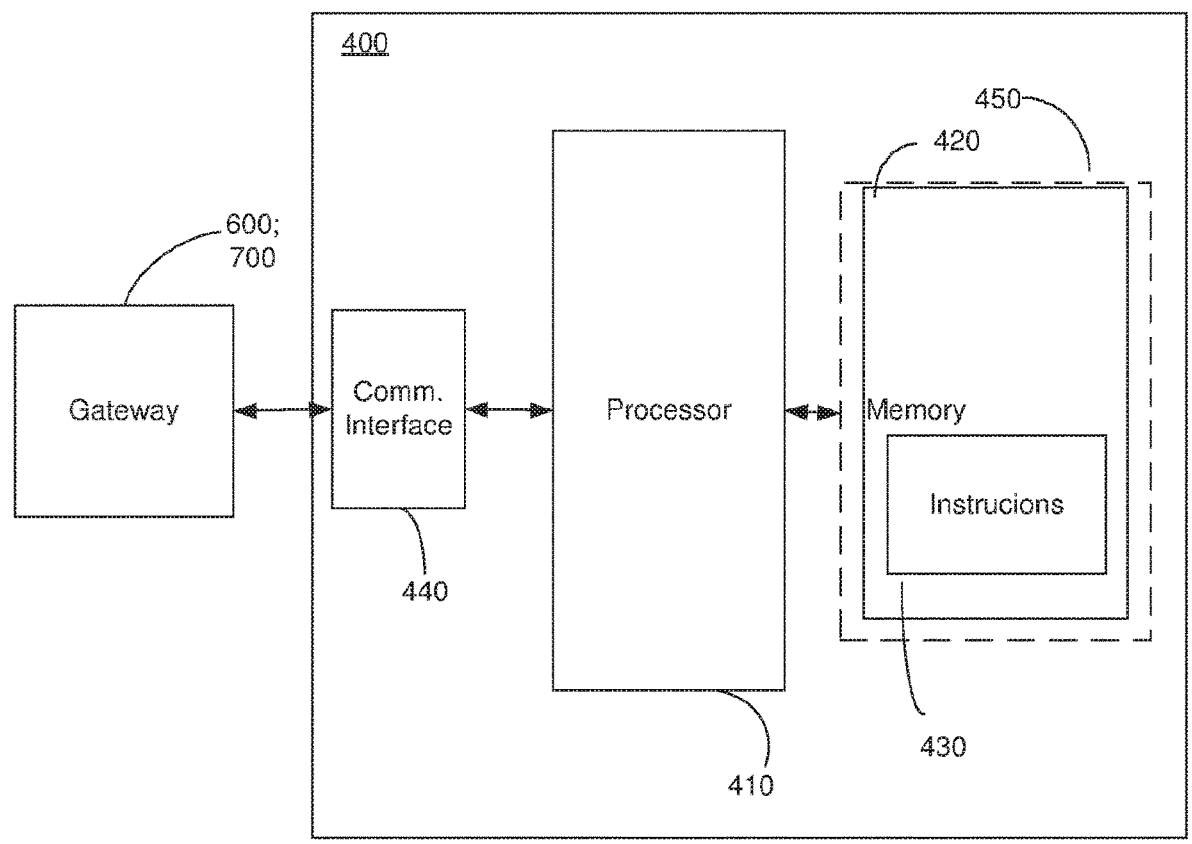
FIG. 4 is a block scheme, illustrating a Machine Device, according to a first embodiment, which is capable of executing the method of FIG. 2
Figure 5:
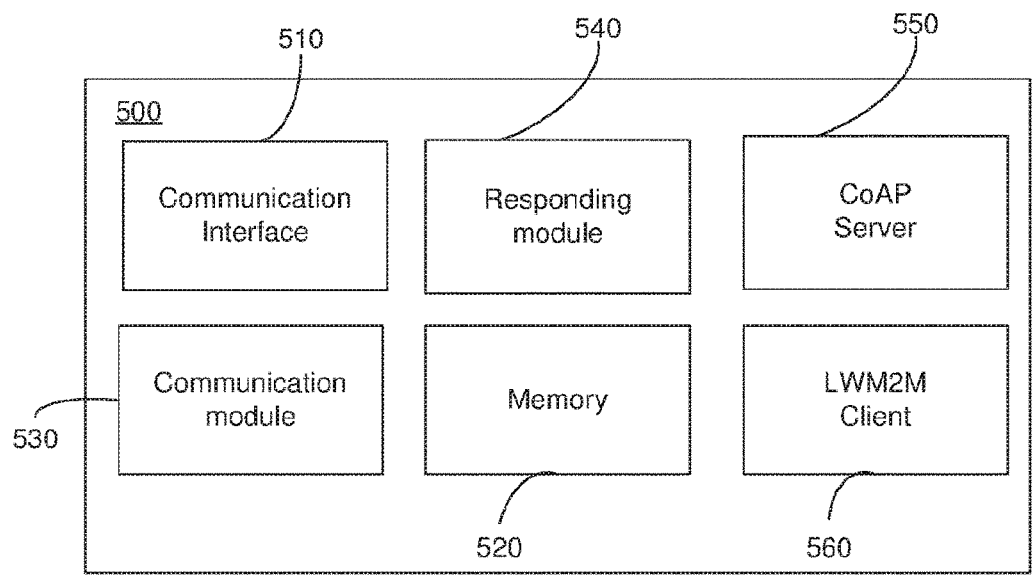
FIG. 5 is a block scheme, illustrating a Machine Device according to a second embodiment, which is capable of executing the method of FIG. 2.

FIG. 4 is illustrating one possible configuration of a MD, or at least part of an MD, which is capable of executing a method, such as the one described above, with reference to FIG. 2. More specifically, the MD 400 of FIG. 4 comprises at least one Processor 410, capable of executing Instructions 430, or Code, stored in a Memory 420, such that when the Instructions 430, or Code, is executed the method mentioned above is executed. The MD 400 also comprises a Communication Interface 440, configured to enable wireless or fixed communication, based on any type of known communication standard, between the MD 400 and a GW 600. Alternatively, the Communication Interface 440 is configured to enable communication between the MD 400 and the GW 600;700 via an intermediate node, which is out of scope of this document. The Memory 420 and the Instructions 430 may, according to one embodiment, be comprised in a computer product 450, which may e.g. be a removable solid state memory, e.g. a flash storage memory, such as e.g. an optical disc, such as e.g. a Compact Disc (CD), or a Digital Versatile Disc (DVD), or a Blu-Ray disc, or a Universal Serial Bus (USB) drive, or any other type of memory means suitable to be attached or inserted on an MD.

According to another embodiment, an MD 500 is configured as comprising a communication interface 510, which may correspond to Communication Interface 440 of FIG. 4, a Memory 520, which may correspond to Memory 420 of FIG. 4, and functional modules, which may be configured as software modules, hardware modules, or a combination of both. Here the modules are represented by a Communication Module 530, configured to execute steps 2:10 and 2:30 of FIG. 2, and a Responding Module 540, configured to execute step 2:20 of FIG. 2. The MD 500 also comprises a CoAP Server 550, and a LWM2M Client 560, each of which is capable to communicate with other corresponding clients and servers, respectively, as described herein. More specifically, the MD, according to any of the embodiments suggested above, is configured to recognize a request, received from a GW, and to respond to such a request, as suggested above, so that network nodes, including the GW and a network node comprising Managing functionality, herein referred to as a Manager Device, can become aware of whether the MD is on or not.

Figure 6:
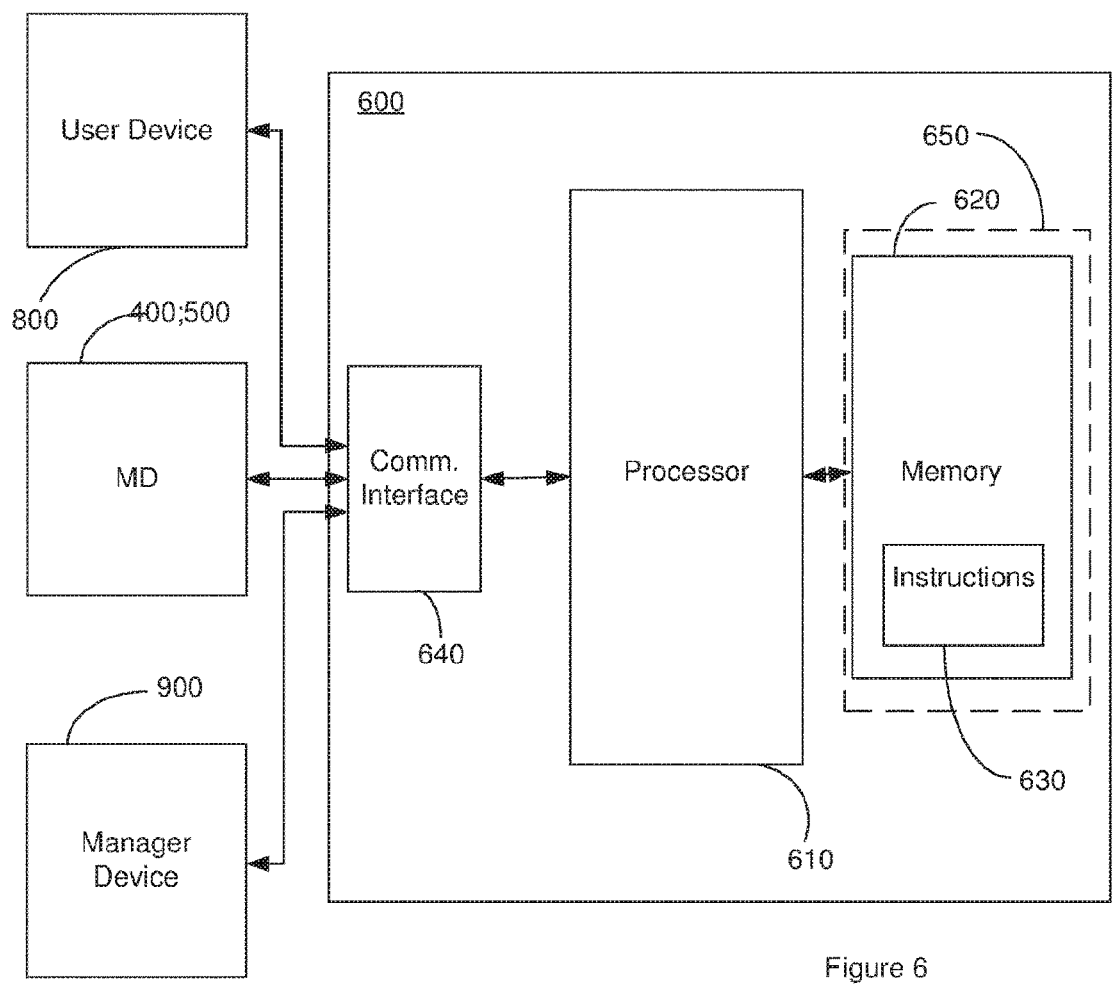
FIG. 6 is a block scheme, illustrating a Gateway according to a first embodiment, which is capable of executing the method of FIG. 3.

FIG. 6 is illustrating one possible configuration of a GW, or another network node comprising GW functionality, which is capable of executing a method, such as the one described above, with reference to FIG. 3. More specifically, the GW 600 of FIG. 6 comprises at least one processor 610, capable of executing instructions, or code, stored in a Memory 620, such that when the Instructions 630, or Code is executed, the method mentioned above is executed. The GW 600 also comprises one or more Communication Interfaces, here represented by Communication Interface 640, configured to enable wireless or fixed communication, based on any type of known communication standard between the GW and a Manager Device 900, one or more MDs 400,500, and one or more User Devices 800, capable of accessing at least one of the MDs 400;500, via a User Device 800 and the GW 600. Alternatively, the Communication Interface 640 is configured to enable communication between mentioned nodes or devices via one or more intermediate nodes, which are out of scope of this document. The Memory 620 and the Instructions 630 may, according to one embodiment, be comprised in a computer product 650, which may e.g. be a removable solid state memory, e.g. a flash storage memory, such as e.g. an optical disc, such as e.g. a Compact Disc (CD), or a Digital Versatile Disc (DVD), or a Blu-Ray disc, or a Universal Serial Bus (USB) drive, or any other type of memory means suitable to be attached or inserted on a GW.

Figure 7:
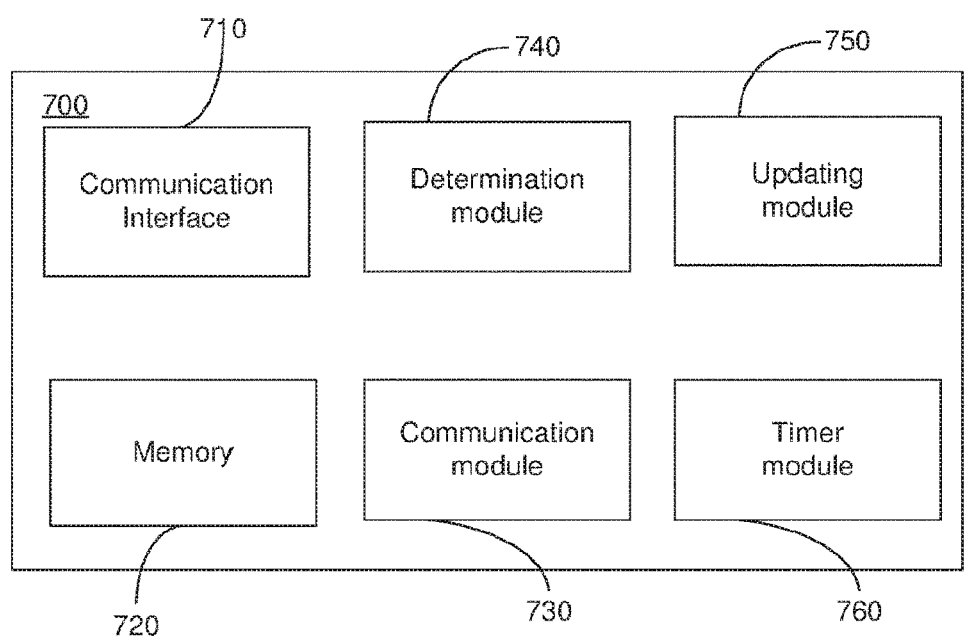
FIG. 7 is a block scheme, illustrating a Gateway according to a second embodiment, which is capable of executing the method of FIG. 3.

According to another embodiment, illustrated in FIG. 7, a GW 700 is configured as comprising at least one communication interface, here represented by Communication Interface 710, which may correspond to Communication Interface 630 of FIG. 6, a Memory 720, which may correspond to Memory 620 of FIG. 6 and functional modules, which may be configured as software modules, hardware modules, or a combination of both. Here the modules are represented by a Communication Module 730, configured to execute steps 3:10, 3:40, 3:50, 3:70, 3:90 and 3:100 of FIG. 3, a Determination Module 740, configured to execute step 3:20, an updating module 750, configured to execute step 3:80 and a Timer Module 760, configured to execute step 3:30 and 3:60 of FIG. 3. Although not explicitly indicated in the figure, the GW 700 also typically comprises a Resource Directory and a Proxy Mirror, or modules capable of providing corresponding functionality, to be used as described herein. More specifically, the GW, according to any of the embodiments suggested above, is configured to provide a user with updated MD data and, as a result of receiving a response to a request sent to an MD, to also provide status updates of the MD to a Manager Device, by applying a mechanism which corresponds to the one described herein.

Figure 8:
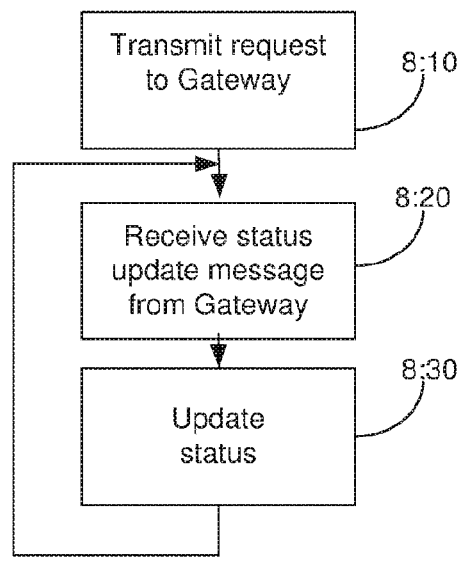
FIG. 8 is a flow chart, illustrating a method executable in a Manager Device, for providing for machine device status updates.

FIG. 8 is a flow chart illustrating a method executable on a network node, capable of performing management procedures, herein referred to as a Manager Device. In a first step 8:10, the Manager Device is transmitting a request to a Gateway, providing instructions to the Gateway on under which conditions status updates, indicating the status of resources of a Machine Device are to be provided to the Manager Device. In a next step 8:20, the Manager Device receives a status update from the Gateway, if appropriate conditions apply, as already described above, and in a next, final step 8:30, the Manager Device can update the status, and, if required also present the status e.g. to an operator, via any suitable presentation means. The process may continue, by awaiting another status update message, until alternative instructions are provided from the Manager Device. The Memory 820 and the Instructions 830 may, according to one embodiment, be comprised in a computer product 840, which may e.g. be a removable solid state memory, e.g. a flash storage memory, such as e.g. an optical disc, such as e.g. a Compact Disc (CD), or a Digital Versatile Disc (DVD), or a Blu-Ray disc, or a Universal Serial Bus (USB) drive, or any other type of memory means suitable to be attached or inserted on the Manager Device.

Figure 9:
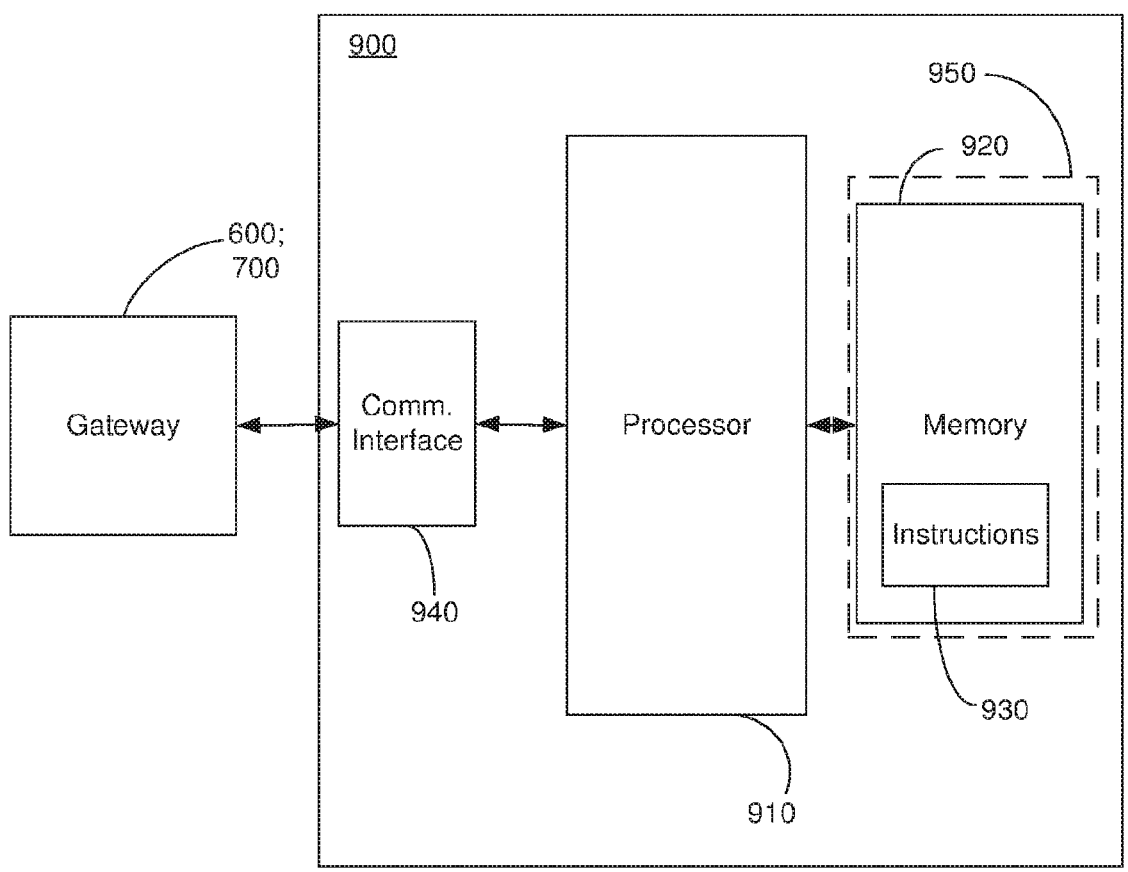
FIG. 9 is a block scheme, illustrating a Manager Device according to a first embodiment, which is capable of executing the method of FIG. 8.

FIG. 9 is illustrating one possible configuration of a Manager Device 900, or at least part of a network node comprising managing functionality, as described above with reference to FIG. 8. More specifically, the Manager Device 900 of FIG. 9 comprises at least one Processor 910, capable of executing Instructions 930, or Code, stored in a Memory 920, such that when the Instructions 930, or Code, is executed the method mentioned above is executed. The Manager Device 900 also comprises a Communication Interface 940, configured to enable wireless or fixed communication based on any type of known communication standard between the Manager Device 900 and a GW 600;700. Alternatively, the Communication Interface 930 is configured to enable communication between the Manager Device 900 and the GW 600, 700 via one or more intermediate nodes, which is out of scope of this document. The Memory 920 and the Instructions 930 may, according to one embodiment, be comprised in a computer product 650.

Figure 10:
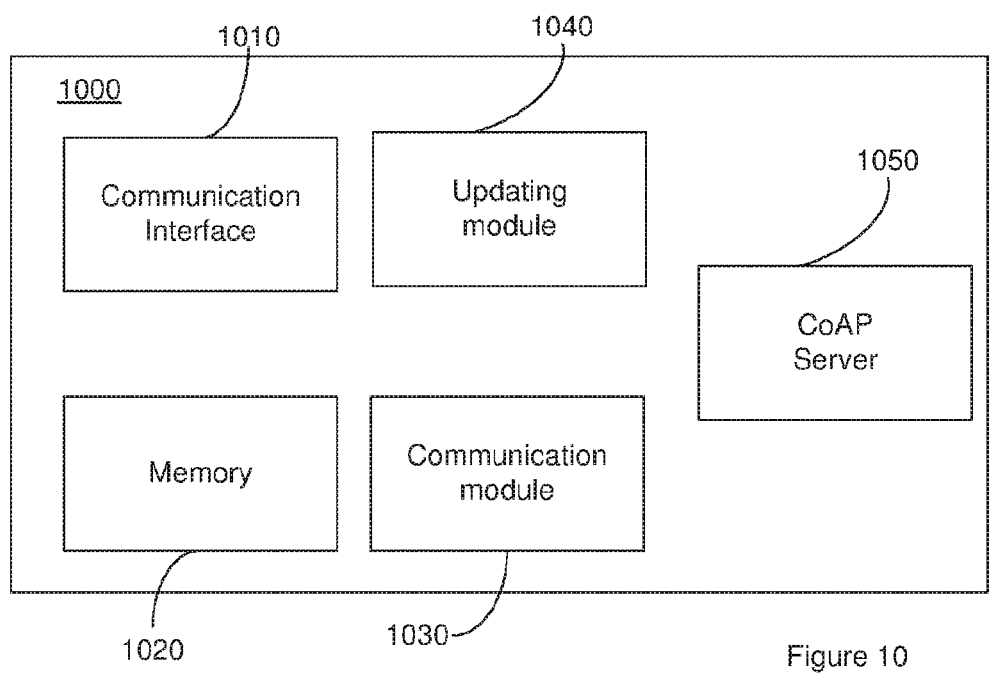
FIG. 10 is a block scheme, illustrating a Manager Device according to a second embodiment, which is capable of executing the method of FIG. 8.

According to another embodiment, as illustrated in FIG. 10, a Manager Device 1000 is configured as comprising a Communication Interface 1010, which may correspond to Communication Interface 930 of FIG. 9, a Memory 1020, which may correspond to Memory 920 of FIG. 9 and functional modules, which may be configured as software modules, hardware modules, or a combination of both. Here the modules are represented by a Communication Module 1030, configured to execute steps 8:10 and 8:20 of FIG. 8, and an Updating Module 1040, configured to execute step 8:30 of FIG. 8. The Manager Device 1000 also comprises a CoAP Server 1050 capable of communicating with the GW via the Communication Interface 1010. More specifically, the Manager Device 1000 according to any of the embodiments suggested above is configured to instruct a GW on under which conditions to receive status updates; recognize an update received from a GW, and to update the status as indicated in the received update.

It is to be understood that the choice of modules or units, as well as the naming of the modules or units within this disclosure are only for exemplifying purpose. It should also be noted that the modules or units described in this disclosure are to be regarded as logical entities which are not with necessity configured as separate physical entities, but which could alternatively be configured as combined units or modules, as long as the described functionality can be obtained.

Any of the Processors mentioned above may be a single CPU (Central processing unit), but could also comprise two or more Processing Units. For example, the Processor may include general purpose Microprocessors; instruction set Processors and/or related Chips Sets and/or special purpose Microprocessors such as ASICs (Application Specific Integrated Circuit). The Processors may also comprise Board Memory for caching purposes. The Computer Program may be carried by a Computer Program Product connected to the Processor. The Computer Program Product may comprise a Computer Readable Medium on which the Computer Program is stored. For example, the Computer Program Product may be a Flash Memory, a RAM (Random-access memory) ROM (Read-Only Memory) or an EEPROM.

It is to be understood that, for simplicity reasons, each node or device described above have been simplified so that only functionality which is of relevance for the understanding of the described technical solution has been added while other commonly used functionality which is not necessary for the understanding of the suggested concept has been omitted.

It is also to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

The scope of the following claims should not be limited by the preferred embodiments as set forth in the examples given above, but should be given the broadest interpretation consistent with the description as a whole.

The invention claimed is:

1. A method performed by a gateway capable of communicating with a machine device, a user device, and a manager device, the method comprising:
   the gateway receiving, from the manager device, a first request requesting status information associated with the machine device, wherein the machine device and the manager device are separate devices;
   determining under which conditions to update the status information, and under which conditions to send the status information to the manager device, wherein information indicating the conditions is provided to the gateway from the manager device;
   determining, the relevant status information of the machine device, based on a response to a second request, requesting for updated data associated with the machine device, and applying the determined conditions for updating the requested status information, the second request being received from the user device, and forwarded to the machine device by the gateway, and the response being received from the machine device by the gateway; and
   providing, to the manager device, according to the determined conditions for sending the acquired status information to the manager device, a notification comprising the determined status information.

2. The method according to claim 1, further comprising:
   initiating a timer upon forwarding the second request to the machine device; and
   determining the status of the machine device based on:
   receipt of the response message transmitted by the machine device in response to the request transmitted by the user device in the case where the response message transmitted by the machine device is received before time-out of the timer, or
   status information already known by the gateway in case where the timer has timed out before the gateway receives the response message transmitted by the machine device.

3. The method according to claim 1, further comprising: storing the status information obtained as a result of receiving the request for information originating from the user device.

4. The method according to claim 1, further comprising:
   after receiving the request for information, activating a timer, wherein the status information indicating a status of the machine device is transmitted to the manager device as a result of the timer expiring prior to the gateway receiving from the machine device any response to the request for information.

5. The method according to claim 1, further comprising:
   receiving from the manager device a third request requesting status information associated with the machine device, wherein the third request includes information regarding a time limit;
   starting a timer; and
   providing to the manager device status information already known by the gateway in case where the timer has reached the time limit before the gateway has received from the user device a fourth request requesting for updated data associated with the machine device.

6. A gateway, comprising:
   a memory; and
   a processor, wherein the processor is configured to:
   process a first received request requesting status information associated with a machine device, wherein the first received request was transmitted by a manager device and further wherein the machine device and the manager device are separate devices;
   determining under which conditions to update the status information, and to send the status information to the manager device, wherein information indicating the conditions is provided to the gateway from the manager device;
   determining, the relevant status information of the machine device, based on a response to a second request, requesting for updated data associated with the machine device, and applying the determined conditions for updating the requested status information, the second request being received from the user device, and forwarded to the machine device by the gateway, and the response being received from the machine device by the gateway; and
   providing, to the manager device, according to the determined conditions for sending the acquired status information to the manager device, a notification comprising the determined status information.

7. The gateway of claim 6, wherein the gateway is configured to:
   initiate a timer upon forwarding the request for information to the machine device, and
   determine the status of the machine device based on:
   the response message, in case the response message is received before time-out of the timer, or
   status information already known by the gateway, in case no response is received prior to the time-out of the initiated timer.

8. The gateway according to claim 6, further comprising a data storage for storing the status information obtained as a result of receiving the request for information.

9. The gateway according to claim 6, wherein the gateway is configured to:
   activate a timer after receiving the request for information; and as a result of the timer expiring prior to the gateway receiving from the machine device any response to the request for information, transmitting to the manager device the status information indicating a status of the machine device.

\* \* \* \* \*